United States Patent [19]

Miller et al.

[11] Patent Number: 4,897,137

[45] Date of Patent: Jan. 30, 1990

[54] PRIMER FOR USE ON EPDM ROOFING MATERIALS

[75] Inventors: Dennis P. Miller; Laurence G. Dammann, both of Columbus, Ohio

[73] Assignee: Ashland Oil, Inc., Russell, Ky.

[21] Appl. No.: 239,719

[22] Filed: Sep. 1, 1988

Related U.S. Application Data

[63] Continuation-in-part of Ser. No. 887,594, Jul. 21, 1986, abandoned.

[51] Int. Cl.$^4$ .................. B32B 25/18; C08J 5/12; C08L 15/02; C08L 51/02
[52] U.S. Cl. .................... 156/157; 156/281; 156/315; 156/333; 524/505; 525/96; 525/98; 525/99
[58] Field of Search ............... 525/96, 98, 99; 524/505; 156/157, 315, 333, 281

[56] References Cited

U.S. PATENT DOCUMENTS

| | | | |
|---|---|---|---|
| 3,258,388 | 6/1966 | Coleman et al. | 156/333 |
| 3,258,389 | 6/1966 | Coleman et al. | 156/333 |
| 3,282,883 | 11/1966 | De Crease et al. | 524/197 |
| 3,879,337 | 4/1975 | Marino et al. | 252/182 |
| 3,917,609 | 11/1975 | Crossland et al. | 524/478 |
| 3,962,369 | 6/1976 | Chang et al. | 428/121 |
| 4,041,103 | 8/1977 | Davison et al. | 525/92 |
| 4,119,587 | 10/1978 | Jazenski et al. | 524/104 |
| 4,194,940 | 3/1980 | Damico et al. | 156/331 |
| 4,450,252 | 5/1984 | Fieldhouse | 156/153 |
| 4,501,842 | 2/1985 | Chmiel et al. | 524/505 |
| 4,640,730 | 2/1987 | Streets et al. | 156/157 |
| 4,742,119 | 5/1988 | Close | 525/211 |

OTHER PUBLICATIONS

Kraton Property Guide-Shell, (no date).
Polysar Material Safety Data Sheet, 12/84.
Amoco Resin 18 Bulletin, R27a, (no date).

*Primary Examiner*—Allan M. Lieberman
*Attorney, Agent, or Firm*—Mary E. Picken

[57] ABSTRACT

This invention is a primer for use on EPDM roofing membranes in conjunction with neoprene (polychloroprene) based contact adhesives which comprises an admixture of thermoplastic block copolymers, halogenated butyl rubber, aromatic hydrocarbon reinforcing resin and solvent.

12 Claims, No Drawings

PRIMER FOR USE ON EPDM ROOFING MATERIALS

CROSS REFERENCE TO RELATED APPLICATIONS

This is a continuation-in-part of Ser. No. 06/887,594 filed July 21, 1986, now abandoned.

BACKGROUND OF THE INVENTION

The present invention relates to primers used in conjunction with neoprene adhesives to adhere roofing materials and more particularly to primer mixtures of thermoplastic block copolymer rubber, halogenated butyl rubber and aromatic hydrocarbon reinforcing resin.

Roofing materials useful for covering large roof areas are customarily prepared in wide sheets for efficient installation. These wide sheets must be overlapped and spliced together when the roofing sheets are installed to provide uniform surfaces. Overlap splicing is often done under extreme weather conditions and the adhered sections must continue to withstand severe weather at extremes of cold and hot temperatures for many years. Roofing materials are available in black and in various colors including white.

Customarily roofing materials, made from plastic, rubber or ethylene propylene diene monomer (EPDM), have been spliced together on site with neoprene (polychloroprene) based contact adhesives. A well known treatise, the Handbook of Adhesives edited by Irving Skeist, published by Van Nostrand Reinhold Company, 1977 edition, at page 880, recommends the use of neoprene based adhesives on EPDM substrates.

EPDM membranes are a very popular form of single ply roofing. Although black EPDM membrane is the most widely used, white EPDM membrane is gaining in popularity. Often they are treated with talc, mica, or cellulosic powders to improve processing and handling of the finished membrane. Splice adhesives adhere poorly to these treated surfaces.

It is desirable to use a primer on the EPDM membrane substrate before applying the neoprene based adhesives. The strength and durability of the final bond between adhesive and substrate depend greatly on the strength of the bond created by the primer. Conventional commercial primers typically provide poor bond strengths of about three pounds/inch when used with neoprene based adhesives.

These conventional commercial primers frequently contain environmentally undesirable ingredients such as lead salts and free isocyanates. When black conventional primers are used on white EPDM roofing membranes special techniques are necessary to prevent the black color of the primer from showing on the final adhered surface.

OBJECT OF THE INVENTION

It is accordingly an object of this invention to provide a durable strong primer for EPDM roofing to use in conjunction with neoprene based adhesives. A further object of this invention is to provide a primer for EPDM roofing which is free of environmentally objectionable components such as lead salts and free isocyanates. Another object of this invention is to provide a primer for use on white or other colored EPDM roofing materials. An additional object of this invention is to provide a primer for use on surface treated EPDM roofing.

SUMMARY OF THE INVENTION

In accordance with the present invention a primer is provided for EPDM roofing for use in conjunction with neoprene based adhesives which contains neither lead salts nor isocyanates. This durable strong primer is colorless and can therefore be used on any color of EPDM roofing including white. In one embodiment this invention is a primer composition for use on EPDM roofing membranes which comprises an admixture of 100 parts thermoplastic block copolymer rubber, 10 to 1000 parts halogenated butyl rubber, 10 to 1000 parts reinforcing resin, and sufficient solvent to achieve application viscosity.

In another embodiment this invention is a process for adhering EPDM roofing membranes comprising the steps of (a) cleaning edges of EPDM roofing membrane with solvent, (b) coating said cleaned edges of EPDM roofing membrane with a primer comprising an admixture of 100 parts thermoplastic block copolymer rubber, 10 to 1000 parts halogenated butyl rubber, 10 to 1000 parts reinforcing resin, and sufficient solvent to achieve application viscosity, (c) allowing said primer to dry, (d) applying polychloroprene based contact cement, (e) allowing said polychloroprene based contact cement to dry, and (f) joining said primed, polychloroprene contact cement coated edges.

DESCRIPTION OF THE PREFERRED EMBODIMENT

Both radial block copolymer rubber and linear block copolymer rubber components are useful in the process of this invention. The thermoplastic styrene-ethylene-butylene-styrene (SEBS) block copolymer is preferred. The product sold under the trademark Kraton G 1652 by Shell Oil Company, Houston, Tex., is particularly useful. This is a thermoplastic rubber crumb product having a styrene rubber ratio of 33:67 and a tensile strength of 3000 psi measured by ASTM method 0412 using a tensile tester jaw separation speed of 10 in./min. Kraton SEBS block copolymers are described in U.S. Pat. No. 4,041,103 assigned to Shell Oil Company.

A number of other thermoplastic rubbers were evaluated for performance in the primer of this invention. None of Solprene 161T, Solprene 190T, Kraton G-1657, Kraton DX-1300 or Arakawa D-411 were as effective as Kraton G-1652 thermoplastic rubber, all providing only 50% strength performance compared to Kraton G-1652.

The halogenated butyl rubber ingredient is preferably the brominated butyl rubber polymer of brominated isobutylene-isoprene polymer (BIIR) of 46 (ML1+8, 275 degrees Fahrenheit) Mooney viscosity and 1.9% bromine content. The products sold under the trademark Polysar 2030 and Polysar X2 by Polysar Ltd., Sarnia, Ontario, Canada are particularly useful. When 100 parts thermoplastic block copolymer rubber are used in the primer of this invention from 10 to 1000 parts halogenated butyl rubber are used. In a preferred embodiment from 50 to 200 parts brominated butyl rubber are used with 100 parts thermoplastic block copolymer.

The hydrocarbon reinforcing resin component useful in the primer of this invention provides needed wetting properties so that the primer will contact the EPDM roofing effectively. This hydrocarbon resin component of the adhesive must be physically compatible with the resin components of the roofing membrane. The hydrocarbon resins useful in the process of this invention act as strength modifiers of the block copolymer component of the primer since the hydrocarbon resins reinforce the styrene blocks of the thermoplastic styrene-ethylene-butylene-styrene block copolymer component. Among the hydrocarbon reinforcing resins useful in the process of this invention are hydrogenated alicyclic hydrocarbons, linear homopolymers of alpha methyl styrene and copolymers of styrene or alpha methyl styrene with monomers such as vinyl toluene, acrylic monomers and butadiene. Suitable hydrocarbon reinforcing resins include Amoco resin 18 polyalpha methyl styrene (Amoco, New York, N.Y.), Picco resin 6070 polymerized C7 to C9 aromatic monomer (Hercules, Wilmington, Del.) and Endex 160 resin (Hercules, Wilmington, Del.). From 10 to 1000 parts hydrocarbon reinforcing resin are used with 100 parts thermoplastic block copolymer.

The preferred hydrocarbon reinforcing resin for use in the primer of this invention is the resin sold by Amoco Chemicals Corporation, Chicago, Ill. under the trademark Amoco 18-290 polyalpha methyl styrene having an ASTM E28 softening point of 141 degrees Celsius (286 degrees Fahrenheit), a molecular weight of 960 and a glass transition temperature of 40 degrees Celsius. From 50 to 200 parts polyalpha methyl styrene hydrocarbon reinforcing resin are used with 100 parts thermoplastic block copolymer in the preferred embodiment of this invention. Table 3 at page 313 of Skeist, *Handbook of Adhesives* lists Amoco resin 18-290 as an endblock compatible resin useful with A-B-A block copolymer thermoplastic rubbers.

The preferred solvent used to prepare the primer of this invention is toluene. Other solvents such as xylene and other aromatic hydrocarbons, chlorinated hydrocarbons such as monochlorobenzene, aliphatic hydrocarbons, esters, ketones and mixtures thereof are also potentially useful. When 100 parts by weight thermoplastic block copolymer are combined with 10 to 1000 parts halogenated butyl rubber and 10 to 1000 parts hydrocarbon reinforcing resin, toluene in the amount of 3 to 100 parts per 1 part of primer solids is used.

Generally, the solvent is used in an amount such that there is sufficient solvent to achieve appropriate application viscosity in the primer. This appropriate application viscosity corresponds to a percent solids at application of from 5 to 50%. The preferred level of nonvolatile solids in the primer is about 10%.

Minor amounts of diphenyl quanidine, a secondary accelerator for rubber curing may also be added to the primer in the amount of 0.01 to 1.0%. Further modification may be made by the addition of carbon black or other pigments to provide the desired color. Still further modification may be made by the minor addition of silanes, rubber curatives, rubber accelerators or antioxidants.

In addition to the bonding of EPDM roofing sheeting membrane the primer of this invention is useful on other roof sheeting such as neoprene, Hypalon rubber (DuPont, Wilmington, Del.), PIB polyisobutylene (Geotac RPM, Medina, Ohio) and polyvinyl chloride sheeting.

The commerically available primer usually used on EPDM roofing membrane contains butyl rubber, free isocyanate, lead salts and carbon black and is available as Lord TS-3320-19 primer from Lord Corporation, Erie, Pa. It is available in black only.

The primer of this invention is used in conjunction with polychloroprene (neoprene) based contact cement adhesives. There are many neoprene (polychloroprene) based contact adhesives available commercially. Examples of and formulations for these adhesives are documented in many sources. Such sources include *Adhesion and the Formulation of Adhesives*, W. C. Wake, Applied Science Publishes. London and *Handbook of Adhesives*, I. Skeist ed., 2nd Ed., Van Nostrand Reinhold Co., New York. Skeist also suggested that a neoprene-based contact adhesive may be used for bonding EPDM rubber in the *Handbook of Adhesives*.

Currently the most commonly used adhesives for bonding EPDM roofing membrane are based on polychloroprene and phenolic resinate. These materials are dissolved in mixtures of solvents and modified with hydrocarbon resins, fillers, curatives and stabilizers. Neoprene adhesives of this type are the most suitable for use with the primer of this invention. Representative adhesives of this kind are Pliobond 2368 adhesive and Pliobond 2377 adhesive available from Ashland Chemical Co., Columbus, OH; N-100 adhesive available from Carlisle Corp., Carlisle, PA; and Uniroyal 6317 adhesive available from Uniroyal, Inc., Middlebury, CT.

Evaluations of the primer of this invention were made in conjunction with Pliobond 2368 polychloroprene (neoprene) based contact cement adhesive which is used at 24.0% solids by weight and has a viscosity of 800 to 1200 centipoise as measured with a number 2 spindle at 20 RPM with a RVT Brookfield viscosimeter.

The following Examples show how the present invention can be practiced but should not be construed as limiting. In this application, all percentages and proportions are by weight and all units are in the metric system, unless otherwise expressly indicated. Also, all citations herein are expressly incorporated herein by reference.

EXAMPLE 1 (4498-78)

This example illustrates the preparation of the primer of this invention. Polysar bromobutyl rubber X-2 at 25% in toluene in the amount of 13.32 grams, Kraton G-1652 block copolymer rubber at 25% in toluene in the amount of 13.32 grams, Amoco 18-290 polyalpha methyl styrene reinforcing resin in the amount of 3.33 grams and 0.20 grams diphenyl quanidine secondary accelerator were blended until solution was completed. Toluene in the amount of 69.83 grams was added and the entire mixture blended until solution was complete.

The primer was applied by brush to a hexane cleaned single ply ethylene propylene diene monomer (EPDM) roofing membrane (sold by Goodyear, Akron, Ohio under the Versigard trademark). After solvent had evaporated Pliobond 2368 polychloroprene (neoprene) based contact cement adhesive (Ashland Chemical Co., Columbus, Ohio) for black membrane or Pliobond 2377 polychloroprene (neoprene) based contact cement adhesive (Ashland Chemical Co., Columbus, Ohio) for white membrane was brushed over the primer and allowed to dry. Two such treated pieces of roofing membrane were hand assembled and hand rolled to effect intimate contact. One inch sample strips were cut from this sheet and compared to a similar bond assembly prepared with a standard commercial primer Lord TS 3320-19 primer (Lord Corporation, Erie, Pa.). Test results were observed on samples aged at room temperature for 1 and 7 days. Peel values were measured using an Instron Tester with a crosshead speed of 2 inches/minute with a 1 inch wide strip in a t-peel configuration following ASTM D-413 procedure. Test results are reported in Table 1.

TABLE 1

(4498-78)
Peel Values (lbs./in.)

| Primer | Clean Membrane | | Talc Membrane | | White Membrane | |
|---|---|---|---|---|---|---|
| | 24 hr | 7 day | 24 hr | 7 day | 24 hr | 7 day |
| Example 1 | 4.0 | 5.0 | 4.2 | 5.1 | 4.1 | 5.7 |
| Commercial | 3.1 | 3.0 | 3.3 | 3.0 | 3.0 | 3.0 |

In every test the primer of the invention provided stronger bonds with neoprene based adhesive than the commercial primer.

EXAMPLE 2 (4498-77)

This example illustrates the use of a different bromobutyl rubber in the primer of this invention. The procedure of Example 1 was followed except 13.32 grams Polysar 2030 bromobutyl rubber was used in place of Polysar X2 bromobutyl rubber. The membrane was clean black Versigard membrane. Test results are reported in Table 2.

TABLE 2

| Primer | Peel Values (lbs./in.) | | |
|---|---|---|---|
| | 24 hr | 72 hrs | 7 days |
| Example 2 | 3.5 | 4.5 | 5.0 |
| Commercial | 3.0 | 3.9 | 4.1 |
| Omit primer | 1.9 | 1.9 | 2.0 |

The primer of the invention provided stronger bonds with neoprene based adhesive than the commercial primer.

EXAMPLE 3 (4498-100)

This example illustrates the use of another halogenated butyl rubber in the primer of this invention. Exxon 2255 bromobutyl rubber in the amount of 13.32 grams was substituted for the Polysar X2 bromobutyl rubber in the formulation of Example 1. The substrate was clean black Versigard membrane. Bonded samples were aged under the conditions of room temperature (RT), 158 degrees Fahrenheit air, and immersion in water at 158 degrees Fahrenheit. Peel values were determined at the indicated intervals. Results appear in Table 3.

TABLE 3

Peel Value (lbs./in.)

| Primer | Storage Condition | Days Aging | | | | | |
|---|---|---|---|---|---|---|---|
| | | 1 | 7 | 14 | 28 | 56 | 84 | 112 |
| Example 3 | RT | 3.8 | 4.4 | 4.4 | 4.9 | 4.7 | 4.7 | 4.6 |
| 158F | Air | 3.9 | 3.1 | 3.0 | 2.4 | 2.0 | 1.8 | 1.7 |
| 158F | H$_2$O | 3.1 | 4.9 | 5.5 | 5.6 | 4.9 | 4.3 | 4.2 |
| Commercial | RT | 3.1 | 3.0 | 2.8 | 3.0 | 2.8 | 2.8 | 2.9 |
| 158F | Air | 5.1 | 4.7 | 4.9 | 5.3 | 5.2 | 5.3 | 5.1 |
| 158F | H$_2$O | 3.6 | 4.3 | 4.9 | 5.3 | 5.5 | 5.3 | 4.8 |

EXAMPLE 4 (4498-86)

This example illustrates the use of another thermoplastic block copolymer, Solprene 161T copolymer being substituted for the Kraton G-1652 block copolymer ingredient in Example 1. The following results were obtained when this primer was used on black Versigard roofing membrane along with Pliobond 2368 polychloroprene (neoprene) based contact cement adhesive.

TABLE 4

| Primer | Peel Values (lbs./in.) | |
|---|---|---|
| | 24 hours | 5 days |
| Example 4 | 2.1 | 2.1 |
| Commercial | 3.0 | 4.1 |

EXAMPLE 5 (4498-104)

This example illustrates the use of Endex 160 reinforcing resin substituted for the Amoco 18-290 polyalpha methyl styrene reinforcing resin component of Example 1 in the amount of 3.33 grams. The substrate was clean black Versigard membrane. Results appear in Table 5.

TABLE 5

| Primer | Peel Values (lbs./in.) | | |
|---|---|---|---|
| | 24 hours | 72 hours | 7 days |
| Example 5 | — | — | 4.6 |
| Commercial | 3.0 | 3.9 | 4.1 |

At 7 days the primer of Example 5 gave a stronger bond when used with neoprene based adhesives than did the commercial primer.

EXAMPLE 6 (4498)

Different amounts of block copolymer, halogenated butyl rubber and modifying resin were tested in this Example to identify optimum levels for each component. The procedure of Example 1 was followed using the proportions indicated in Table 6. The substrate was clean black Verisgard roofing membrane. Pliobond 2368 adhesive was used.

TABLE 6

| Primer Sample | Bromobutyl Rubber Polysar 2030 | Modifying Resin Amoco 18-290 | Kraton Block Copolymer G-1652 | Peel Values (lbs./in.) | | |
|---|---|---|---|---|---|---|
| | | | | 24 HRS | 72 HRS | One WEEK |
| 4498-90 | 44.5 | 44.5 | 11.0 | 1.1 | 1.6 | 1.8 |
| 4498-91 | 22.3 | 22.3 | 55.4 | 2.3 | 3.3 | 4.1 |
| 4498-92 | 11.0 | 44.5 | 44.5 | 2.7 | 3.7 | 4.4 |
| 4498-93 | 55.4 | 22.3 | 22.3 | 1.2 | 1.6 | 1.8 |
| 4498-94 | 44.5 | 11.0 | 44.5 | 3.0 | 3.8 | 4.3 |
| 4498-95 | 22.3 | 55.4 | 22.3 | 4.2 | 5.2 | 5.6 |
| Commercial | — | — | — | 3.0 | 3.9 | 4.1 |
| Commercial | — | — | — | 4.0 | 5.3 | 5.7 |

The best bond strengths appear when the primer of this invention comprises from 44.5 to 55.4 parts thermoplastic block copolymer rubber, from 22.3 to 44.5 parts halogenated butyl rubber, from 11.0 to 55.4 parts hydrocarbon resin and sufficient solvent to achieve application viscosity.

EXAMPLE 7 (4498-98)

This example illustrates the durability and excellent aging of an EPDM membrane adhesive bond primed with the primer of Example 1 with two parts Codispersion 22-R-25 carbon black added per 100 parts solids. Bonded samples were aged under the conditions of room temperature (RT), 158 degrees Fahrenheit air, and immersion in water at 158 degrees Fahrenheit. Peel values were determined at the indicated intervals. The substrate was EPDM membrane which had been treated with talc. Results are reported in Table 7.

TABLE 7

| | | Peel Value (lbs./in.) | | | | | | |
|---|---|---|---|---|---|---|---|---|
| | Storage | Days Aging | | | | | | |
| Primer | Condition | 1 | 7 | 14 | 28 | 56 | 84 | 112 |
| Example 1 | RT | 3.9 | 4.6 | 4.5 | 4.9 | 4.6 | 4.9 | 5.3 |
| | 158F Air | 4.7 | 4.9 | 5.1 | 4.8 | 5.0 | 5.3 | 5.1 |
| | 158F Water | 3.3 | 3.4 | 3.5 | 3.5 | 3.4 | 3.3 | 3.3 |
| Commercial | RT | 3.7 | 2.9 | 2.6 | 2.2 | 2.3 | 2.6 | 2.7 |
| | 158F Air | 2.8 | 2.7 | 2.9 | 3.5 | 3.7 | 3.7 | 3.5 |
| | 158F Water | 2.2 | 2.3 | 2.8 | 2.8 | 3.5 | 3.4 | 3.0 |

The primer of Example 1 aged at 158 degrees Fahrenheit in Air and Room Temperature conditions was superior in performance to the commercial primer.

EXAMPLE 8 (4498-78)

This example illustrates the superior high temperature peel retention of the primer of this invention compared to the existing commercial primer. Using both talc treated and white EPDM membranes the bonds were assembled as in Example 1. The bonded EPDM was stored at room temperature for 4 days and tested for peel values at various temperatures. The results are reported in Table 8.

TABLE 8

| | | Peel Value (lbs./in.) | | | |
|---|---|---|---|---|---|
| | | Conditions | | | |
| Primer | Membrane | RT | 120F | 158F | 190F |
| Example 1 | Talc | 4.6 | 3.1 | 2.2 | 0.9 |
| Commercial | Talc | 3.7 | 1.9 | 0.8 | 0.7 |
| Example 1 | White | 5.0 | 3.3 | 2.7 | 1.5 |
| Commercial | White | 3.0 | 1.7 | 0.5 | 0.5 |

The primer of this invention provided stronger bonds at all test temperatures than the commercial primer.

EXAMPLE 9

This example presents lap shear test data on samples using the primer of this invention prepared following the procedures provided in Example 1 along with Pliobond 2368 polychloroprene (neoprene) based contact cement adhesive. Controls were also done using neoprene adhesive alone, omitting the primer of this invention. Test results were observed on samples aged under the different conditions stated for 1, 7 and 14 days. Lap shear values were measured using a 4204 Instron tester having a load cell of 100 pounds following ASTM D3163-7 procedure. Test results are reported in Table 9.

We claim:

1. A primer composition for use on EPDM roofing materials in conjunction with polychloroprene based roofing adhesive comprising an admixture of:
   100 parts styrene-ethylene-butylene-styrene thermoplastic block copolymer rubber, from 10 to 1000 parts brominated isobutylene-isoprene butyl rubber polymer,
   from 10 to 1000 parts aromatic hydrocarbon reinforcing resin selected from the group consisting of
   hydrogenated alicyclic hydrocarbons, linear homopolymers of alpha methyl styrene, and copolymers of styrene or alpha methyl styrene with vinyl toluene monomer or butadiene monomer, and mixtures thereof,
   and sufficient solvent to achieve application viscosity.

2. The primer composition as recited in claim 1 further comprising from 0.5 to 5.0 parts diphenyl guanidine based on 100 parts total solids of said admixture.

3. The primer composition as recited in claim 1 wherein said admixture comprises 100 parts thermoplastic block copolymer rubber, from 50 to 150 parts brominated isobutylene-isoprene butyl rubber, from 50 to 150 parts aromatic hydrocarbon reinforcing resin and sufficient solvent to achieve application viscosity.

4. The primer composition as recited in claim 3 wherein said admixture comprises 100 parts thermoplastic block copolymer rubber, 100 parts bromoinated isobutylene-isoprene butyl rubber, 100 parts aromatic hydrocarbon reinforcing resin and sufficient solvent to achieve application viscosity.

5. The primer composition as recited in claim 2 further comprising carbon black.

6. The primer composition as recited in claim 2 further comprising an anti-oxidant.

7. A process for adhering EPDM roofing membrane materials comprising the steps of:
   (a) cleaning edges of EPDM roofing membrane with solvent,
   (b) coating said cleaned edges of EPDM roofing membrane with a primer comprising an admixture of 100 parts styrene-ethylene-butylene-styrene thermoplastic block copolymer rubber, from 10 to 1000 parts brominated isobutylene-isoprene butyl rubber polymer, from 10 to 1000 parts aromatic hydrocarbon reinforcing resin selected from the group consisting of hydrogenated alicyclic hydrocarbons, linear homopolymers of alpha methyl styrene, and copolymers of styrene or alpha methyl styrene with vinyl toluene monomer or butadiene monomer, and mixtures thereof, and sufficient solvent to achieve application viscosity,

TABLE 9

| | | | (AF 10347) | | | |
|---|---|---|---|---|---|---|
| | | | Lap Shear Values (lbs./in.) | | | |
| | | | Clean Membrane | | Talc Membrane | |
| Days | Condition Aging | Test | Omit Primer | Primer | Omit Primer | Primer |
| 1 | RT | RT | 11.4 ± 0.8 | 18.0 ± 4.4 | 16.4 ± 0.3 | 25.7 ± 1.7 |
| 7 | RT | RT | 14.2 ± 1.2 | 21.1 ± 0.3 | 18.3 ± 0.6 | 38.9 ± 4.1 |
| 14 | RT | RT | 16.0 ± 0.4 | 22.8 ± 0.9 | 18.5 ± 0.8 | 41.0 ± 2.4 |
| 7 | 158F | 158F | 9.6 ± 0.8 | 13.6 ± 0.9 | 12.0 ± 1.0 | 12.7 ± 0.3 |
| 14 | 158F | 158F | 10.0 ± 0.4 | 15.5 ± 0.3 | 11.2 ± 1.5 | 13.1 ± 1.1 |
| 7 | 180F | 180F | 7.6 ± 0.9 | 10.9 ± 1.1 | 11.8 ± 0.5 | 10.4 ± 1.1 |
| 14 | 180F | 180F | 8.0 ± 0.7 | 12.1 ± 1.0 | 8.8 ± 0.1 | 9.0 ± 0.7 |

(c) allowing said primer to dry,
(d) applying polychloroprene based contact cement,
(e) allowing said polychloroprene based contact cement to dry, and
(f) joining said primed, polychloroprene based contact cement coated edges.

8. The process as recited in claim 7 wherein the primer of step (b) further comprises from 0.5 to 5.0 parts diphenyl guanidine based on 100 parts total solids of said admixture.

9. The process as recited in claim 7 wherein the primer of step (b) comprises 100 parts thermoplastic block copolymer rubber, from 50 to 150 parts brominated isobutylene-isoprene butyl rubber, from 50 to 150 parts aromatic hydrocarbon reinforcing resin and sufficient solvent to achieve application viscosity.

10. The process as recited in claim 9 wherein the primer of step (b) comprises 100 parts thermoplastic block copolymer rubber, 100 parts brominated isobutylene-isoprene butyl rubber, 100 parts aromatic hydrocarbon reinforcing resin and sufficient solvent to achieve application viscosity.

11. The process as recited in claim 7 wherein the primer of step (b) further comprises carbon black.

12. The process as recited in claim 7 wherein the primer of step (b) further comprises an antioxidant.

* * * * *